United States Patent [19]
Adams et al.

[11] Patent Number: 5,490,211
[45] Date of Patent: Feb. 6, 1996

[54] AUTOMATIC CALL DISTRIBUTOR WITH INTERNAL WRITTEN MESSAGE COMMUNICATION SYSTEM AND METHOD

[76] Inventors: David J. Adams, 3 S. 601 Behrs Circle Dr. West, Warrenville, Ill. 60555; Scott D. Jeslis, 719 Quail Run Dr., Plainfield, Ill. 60544; James E. Anderson, 105 Kenilworth Ave., Glen Ellyn, Ill. 60137

[21] Appl. No.: 230,191

[22] Filed: Apr. 20, 1994

[51] Int. Cl.[6] .................................................. H04M 3/00
[52] U.S. Cl. .......................... 379/265; 379/309; 379/201; 379/229
[58] Field of Search .................................. 379/265, 266, 379/309, 218, 214, 213, 201, 96, 67, 88, 93, 142, 229, 210, 212, 216, 247, 94, 91, 97, 207, 95, 196, 211, 89

[56] References Cited

U.S. PATENT DOCUMENTS

4,972,462  11/1990  Shibata ......................................... 379/89
5,163,081  11/1992  Wycherley et al. ...................... 379/265

Primary Examiner—Jeffery A. Hofsass
Assistant Examiner—Scott Wolinsky

[57] ABSTRACT

An automatic call distributor (20) having a multiport switch (22), a central processing unit (24) with a switch operations memory (26) for controlling the switch (22), a plurality of internal telephones (40, 40A, 40B, 40C–N) interconnectable through the multiport switch (22) to external telephones (28) of an external telephonic network (32) and a plurality of display terminals (36, 36A, 36B, 36C–N) for display of information relating to the operation of the switch (22), with an internal written message communication system (21) having an associated switch memory (46) for storing written messages (66) for display at a display terminal (36), a display screen (44) at the display terminal (36) for providing an indication of storage of a written message at the associated switch memory (46) for display at the display terminal (36) and a keyboard (42) at the display terminal (36) for electing to have the written message displayed at the display terminal (36) in lieu of information relating to the operation of the switch (22).

20 Claims, 7 Drawing Sheets

AUTOMATIC CALL DISTRIBUTOR WITH INTERNAL WRITTEN MESSAGE COMMUNICATION SYSTEM AND METHOD

BACKGROUND OF THE INVENTION

1. Field of the Invention

This invention relates generally to the field of automatic telephone call distributors and, more particularly, to automatic call distributors having data display terminals for receipt of data text messages at the call distributor.

2. Description of the Prior Art

Automatic call distributors employing a multiport switch controlled by a central processing unit in conjunction with a switch operations memory for selectively interconnecting telephonic calls received from external telephones of an external telephonic network with agent telephonic units coupled with the multiport switch are well known. Examples of such call distributors are shown in U.S. Pat. No. 5,268,903 of Jones et al. entitled "Multichannel Telephonic Switching Network With Different Signaling Formats and Cross Connect/PBX Treatment Selectable For Each Channel" issued Dec. 7, 1993; U.S. Pat. No. 5,140,611 of Jones et al. entitled "Pulse Width Modulated Self-Clocking and Self-Synchronizing Data Transmission and Method for a Telephonic Communication Network Switching System" issued Aug. 18, 1992; U.S. Pat. No. 5,127,004 of Lenihan et al. entitled "Tone and Announcement Message Code Generator for a Telephonic Switching System and Method" issued Jun. 30, 1992 and U.S. Pat. No. 4,627,047 of Pitroda et al. entitled "Integrated Voice and Data Telecommunication Switching System", issued Dec. 2, 1986.

Agents stationed at the agent telephonic sets service the calls from various callers, such as customers, at the external telephones. In order to monitor the progress and efficiency of the many agents servicing calls received at the call distributor, it is known to provide a plurality of data display terminals at supervisory stations within the automatic call distribution system. The supervisors observe the display terminals to monitor the constantly changing events within the call distributor. The data display terminals often alert the supervisors of many situations including: emergency situation calls, requests for assistance by the agents, call progression, the transferring of calls, the time a customer call is placed on hold or waiting in queue to be serviced and the overall call handling efficiency of agent groups within the system. It is very important that the supervisors continually monitor the changing events on their associated display terminal in order to provide the necessary assistance when needed and to improve the overall call servicing efficiency within the call distribution system.

It is also known in such call distributors to send data text messages between supervisors stationed at data display terminals of a call distributor. In known call distributors a supervisor must go through a series of commands to send a text message to another supervisor at another data display terminal. Unfortunately, the text messages sent and received are only temporarily stored at the volatile memory of the individual cathode ray tube (CRT) terminals or data display terminals. Disadvantageously, a supervisor is unable to permanently store a received data text message, since a message is erased from the display terminal volatile storage when the display screen is changed.

Furthermore, in known call distributors a sent text message spontaneously appears at the screen of the receiving supervisor's data display terminal and blanks out or removes all the information previously displayed on the screen when the message appears. The destination or receiving display terminal is cleared of all data appearing on the screen and the written data text message immediately shown at the terminal. Therefore, upon receipt of a data text message the receiving supervisor is unable to continue to monitor the changing events within the call distributor. Since the data display terminal screen has all the previous working information eliminated when a message appears, the supervisor receiving the message is temporarily stopped from performing his assigned duties of monitoring the operation of the call distributor. The supervisor cannot be alerted to emergency situations, requests for assistance or determine the progress of calls in the call distribution system since this information is blanked out from the display screen.

Thus, in known call distributors, the receiving supervisor does not have any flexibility with respect to whether an incoming data text message is displayed or stored—he or she is at the mercy of the system. Reducing efficiency, once the text message has been received and reviewed, the receiving supervisor must enter a series of complicated and time consuming commands at the display terminal in order to return to a working display showing status and call information relating to the operation of the call distributor.

SUMMARY OF THE INVENTION

It is therefore a principal object of the present invention to provide an automatic call distributor with an internal written message communication system and method in which the disadvantages of known call distributors noted above are overcome by providing means and methods for selectively electing at a display terminal to have a written data text message displayed at the display terminal in lieu of displayed information relating to the operation of the switch of the call distributor.

This object is achieved by providing an automatic call distributor, having a multiport switch, a central processing unit with a switch operations memory for controlling the switch, a plurality of internal telephones interconnectable through the multiport switch to external telephones of an external telephonic network and a plurality of display terminals for display of information relating to the operation of the switch, with an internal written message communication system comprising means for storing written messages at an associated switch memory for display at a selected one of the display terminals, means at the selected one of the display terminals for providing an indication of storage at the associated switch memory of a written message for said selected one of the display terminals and means for electing at the selected one of the display terminals to have the written message displayed at the selected one of the display terminals in lieu of the information relating to operation of the switch.

The object is also achieved by performing a method for communicating terminal written messages in an automatic call distributor, having a multiport switch, a central processing unit with a switch operations memory for controlling the switch, a plurality of internal telephones interconnectable through the multiport switch to external telephones of an external telephonic network and a plurality of display terminals for display of information relating to the operation of the switch, comprising the steps of (a) displaying information relating to the operation of the switch at the display terminals, (b) sending a written message from one of the display terminals for receipt by another one of the display terminals, (c) storing the written message at an associated switch memory coupled with the central processing unit, (d) automatically providing an identification of storage of the stored written message to the other display terminal and (e) electing at the other display terminal to have the written message displayed at the other display terminal in lieu of the information relating to the operation of the switch.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
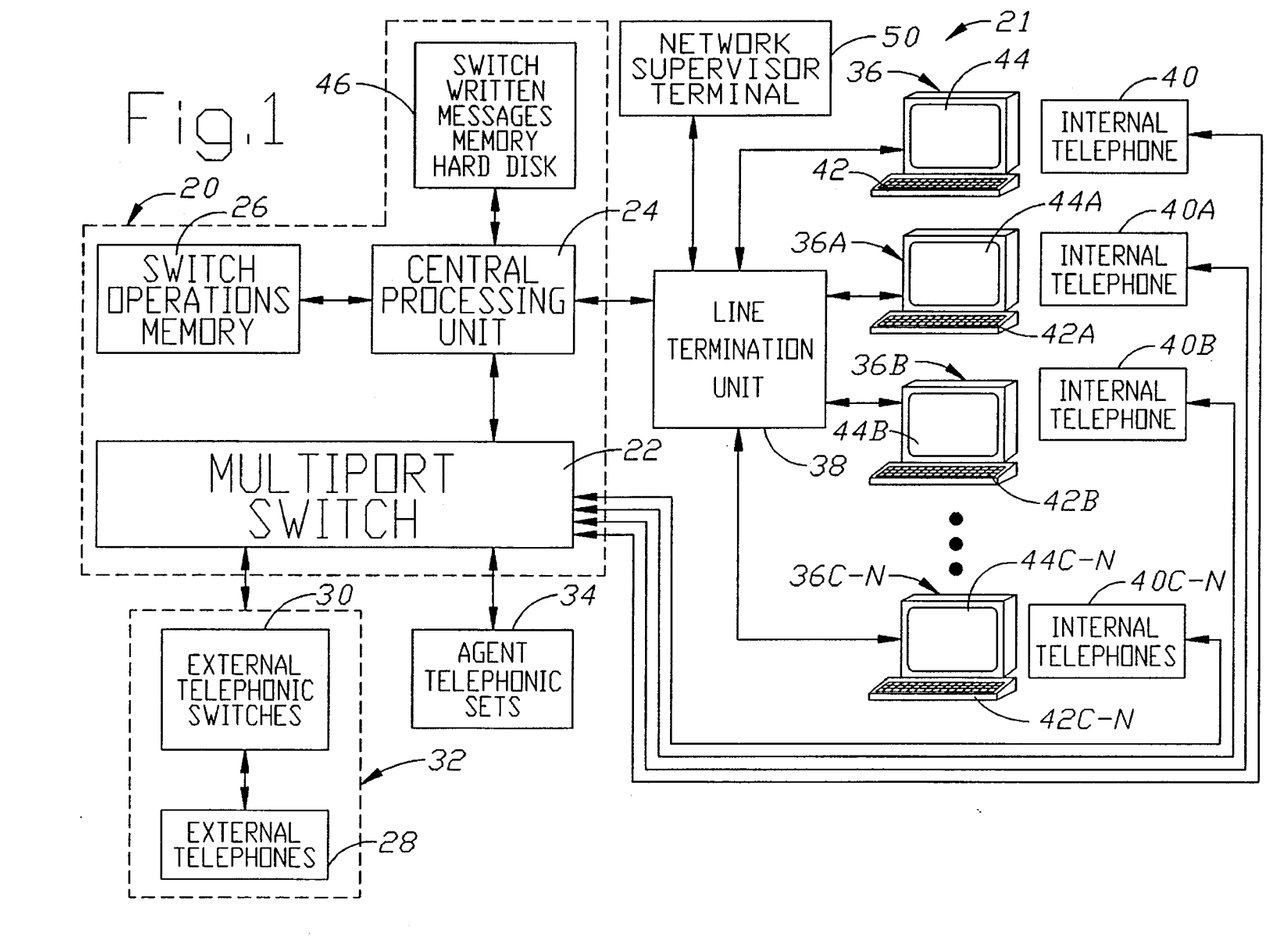
FIG. 1 is a functional block diagram of the preferred embodiment of the automatic call distributor coupled with data display terminals of the internal written message communication system of the present invention as interconnected with a known external telephonic network.

Referring to FIG. 1, automatic call distributor system 21 with automatic call distributor 20 is shown having a multiport switch 22 controlled by a central processing unit 24 in conjunction with a switch operations memory 26 for selectively interconnecting telephonic calls received from external telephones 28 through external telephonic public switches 30 of an external telephonic network 32 with a plurality of agent telephonic sets 34 coupled with the multiport switch of the call distributor. The agents stationed at the agent telephonic sets 34 service the telephonic calls received from the external telephones 28 through the multiport switch 22 of the automatic call distributor 20. Information concerning the call processing events at the automatic call distributor is displayed at a plurality of data display terminals 36, 36A, 36B and 36C–N coupled with the central processing unit 24 via a line termination unit 38.

Preferably, supervisors are stationed at the data display terminals 36, 36A, 36B and 36C–N to monitor the changing call processing situations happening at the call distributor through continuous observation of the information relating to the operation of the switch 22 appearing at the respective display terminals. In accordance with the present invention written data text messages are sent from a sending display terminal, for instance, terminal 36A for receipt at a destination display terminal 36B. The written messages are stored at an associated switch memory 46 which is coupled with central processing unit 24 that controls the overall operation of the switch 22. A supervisor stationed at the receiving or destination display terminal, such as terminal 36B, receives a prompt from the central processing unit 24 indicating that a sent written message is stored for retrieval at the associated switch memory 46.

The user or supervisor at the receiving display terminal 36B, while having information concerning the switch 22 operation displayed at the terminal, optionally elects through actuation of a key at the terminal to have the stored written message displayed at the receiving display terminal in lieu of the displayed information relating to the operation of the switch. Alternatively, the user or supervisor at the receiving display terminal 36B elects to maintain the storage of the sent written message at the associated switch memory 46 for retrieval at a more convenient time. Preferably, the associated switch memory, or switch written messages memory hard disk 46, is a nonvolatile memory device having a plurality of memory mailboxes or memory location groups respectively associated with each of the plurality of display terminals 36, 36A, 36B and 36C–N. Each of the memory mailboxes at the switch written messages memory hard disk 46 has a plurality of memory locations for storing a plurality of written messages for each of the corresponding display terminals 36, 36A, 36B, 36C–N.

The line termination unit 38 is a microprocessor based peripheral hardware circuit card which provides an interface to the central processing unit 24 and an asynchronous communication line adhering to an Electronics Industries Association (EIA) specification RS232C or alternatively an RS422A communication protocol. The central processing unit 24 is preferably a DEC PDP 11/34, 11/44, 11/84 or 11/94 or the like manufactured by the Digital Equipment Corporation. The multiport switch 22 in the preferred embodiment has more than three thousand voice communication I/O ports for connection to agent telephonic sets 34, other internal telephones 40, 40A, 40B, 40C–N, voice response units, other automatic call distributors, emergency recorder and other telephonic devices, not shown. Generally, while the internal written message communication system of the automatic call distributor system 21 of the present invention can be employed with numerous types and sizes of automatic call distributors it is preferably employed in a call distributor of the type shown in U.S. Pat. No. 5,268,903 of Jones et al. entitled "Multichannel Telephonic Switching Network With Different Signaling Formats and Cross Connect/PBX Treatment Selectable For Each Channel" issued Dec. 7, 1993; U.S. Pat. No. 5,140,611 of Jones et al. entitled "Pulse Width Modulated Self-Clocking and Self-Synchronizing Data Transmission and Method for a Telephonic Communication Network Switching System" issued Aug. 18, 1992; U.S. Pat. No 5,127,004 of Lenihan et al. entitled "Tone and Announcement Message Code Generator for a Telephonic Switching System and Method" issued Jun. 30, 1992 and U.S. Pat. No. 4,627,047 of Pitroda et al. entitled "Integrated Voice and Data Telecommunication Switching System", issued Dec. 2, 1986.

The data display terminal 36, has an associated keyboard 42 for entry of a series of commands and for enabling the sending and receipt of written data text messages appearing on the display screen 44 of the display terminal. Preferably, the data display terminals 36 are "dumb" cathode ray tube (CRT) terminals for display of information received from the central processing unit 24. In accordance with the present invention a data display terminal 36A is enabled to send and receive written data text messages from other display terminals 36B, 36C–N. A written message created through actuation of the keyboard 42 at the display terminal 36 is stored at a memory storage location associated with the display terminal assigned to receive the written message at the hard disk 46 coupled with the central processing unit 24. A user at the sending display terminal 36A designates a selected one of the display terminals, for example display terminal 36B, for receipt of the written message created at the sending display terminal. The one display terminal 36B selected to received the written data text message receives a prompt at the associated display screen 44B to provide an indication of storage of the written message stored at a memory location assigned to the selected display terminal 36B at the hard disk 46 of the call distributor.

The user at the designated display terminal 36B has the option to immediately display the stored written message on the display screen 44B or to maintain the written message in the associated written messages memory location at the hard disk 44 for display at a time convenient to the user. The user actuates designated keys on the keyboard 42B at the selected display terminal to elect to have the stored written message displayed at the display screen 44B of the designated receiving terminal. Preferably, the written messages memory hard disk 46 associated with the automatic call distributor is a thirty two megabyte random access memory card for storage of a plurality of written data text messages for each of the plurality of data display terminals 36, 36A, 36B, 36C–N.

As seen in FIG. 1, the plurality of display terminals 36, 36A, 36B, 36C–N are associated with a plurality of internal telephones 40, 40A, 40B, 40C–N. The users, preferably supervisors, use the internal telephones 40–40N for voice communication through the multiport switch 22 in conjunction with the data display terminals 36–36N for receipt of data information regarding the operation of the call distributor.

The internal telephones 40–40N have telephone numbers which are used to identify the individual ones of the plurality of internal telephones for purposes of switching telephonic calls received at the automatic call distributor 20 to selected ones of the internal telephones. The central processing unit 24 associates each data display terminal 36–36N with each individual telephone number for the internal telephones 40–40N. The hard disk memory 46 has memory mailbox locations which identify each individual display terminal 36–36N through association with the corresponding telephone numbers of the internal telephones 40–40N. Written messages are sent from a sending display terminal 36A through actuation on the terminal keyboard 42A with an entered identification code identifying the destination display terminal 36B assigned to receive the message. Preferably, the identification code is the extension telephone number of the internal telephone 40B associated with the destination display terminal 36B receiving the message.

Alternatively, the identification of the receiving display terminal is indicated by a network supervisor code for sending written messages to a network supervisor terminal 50. A network supervisor terminal 50 is a device having a display screen with an associated keyboard but does not have a corresponding internal telephone.

Upon receipt of a received message prompt, the user at the designated display terminal 36B elects to display a received written message sent by the sending display terminal 36A and identified by the associated telephone number, and the written message is shown at the display screen 44B of the designated terminal.

The user at the sending display terminal 36A alternatively enters the telephone extension number of the same display terminal 36A at which he or she is stationed when sending a written message. The written message is stored at the mailbox memory location at the hard disk 46 associated with the same display terminal 36A from which the message is sent. The written message is subsequently displayed at the same display terminal 36A when the message is selectively elected to be displayed upon entrance of a display message command at the terminal. This enables the user or supervisor to send a written message to himself or herself, or to another individual who is at a later time stationed at the same display terminal, such as someone who uses the display terminal during a next work shift.

A written message is sent to a plurality of different display terminals by associating the same written message with the telephone numbers of the plurality of display terminals intended to receive the written message. The user at the sending display terminal 36A enters in the associated telephone extensions for each designated terminal 36B, 36C–N. Advantageously, the user does not have to repeatedly enter the same written message for each of the plurality of display terminals intended to receive the same message. The central processing unit 24 automatically sends the same written message to all the plurality of destination display terminals associated with the received telephone extension numbers.

Upon receipt of written data text messages at the corresponding mailbox location in the switch associated memory 46, the central processing unit 24 sends a prompt message in reverse video to the destination display terminal 36B to identify the plurality of different written messages stored for display at the destination display terminal. Subsequent, to the display of a written message on the screen 44B of the display terminal 36B the user enters a command of the keyboard 42B to return to a working display showing information relating to the call processing events within the call distributor 20. The switch written messages memory hard disk 46 stores the written messages subsequent to the removal of the display of the messages on the screen 44B. Alternatively, the user selectively eliminates written messages from storage through actuation of a delete command at the associated keyboard 42B.

Figure 2:
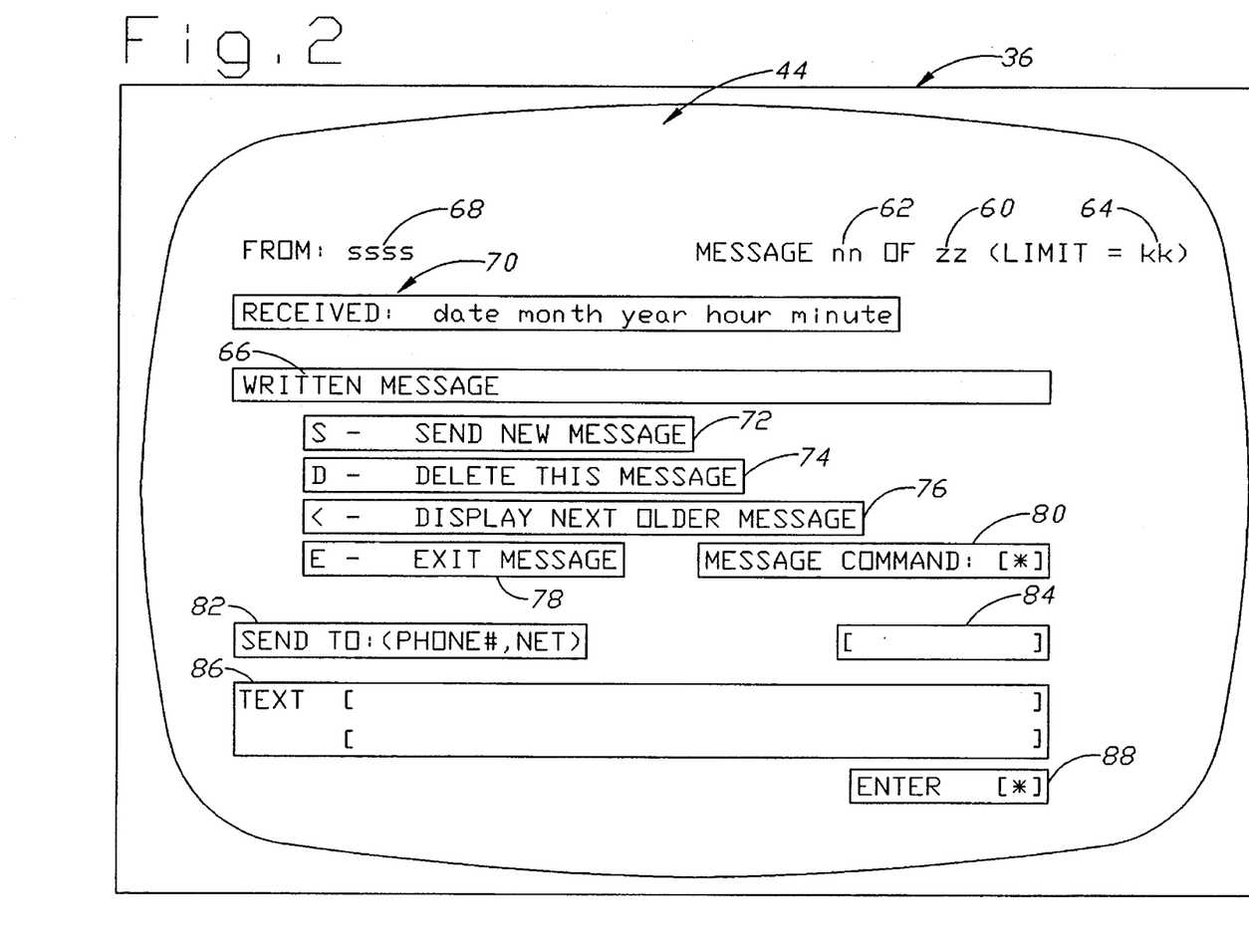
FIG. 2 is a front view of a display screen of a display terminal of the present invention displaying a standard written message display format.

Referring to FIG. 2, a message command, when entered from a keyboard 42 of an off-line display terminal 36, causes the display screen 44 to signal the central processing unit to display the following information in a standard format with the following written message functions:

1). A status message containing the total number 60 of written data text messages stored for the data display terminal position, an indication of which written message is currently being displayed 62 and the maximum size of the display terminal mailbox 64 at the associated switch memory 46, FIG. 1. The numeric location 62 of the displayed written message 66 out of the total number of stored messages 60 is shown at the screen display format.

2). A read written message window contains the last written message 66 received, if any. The identity or source of the originator of the written message is indicated by displaying the last four digits 68 of the telephone number of the sending terminal. The date and time that the data text message 70 was received in the switch associated memory and the actual written data text sent 66 are also displayed in the message command standard screen format.

3). A menu of available message commands which act as instructions for subsequent operations on the stored message are provided, as follows: sending new message 72, deleting this message 74 to delete the message currently displayed in the read written message window, display the next older message 76, and exit message 78 to exit the utility message.

The keyboard 42, FIG. 1, of the display terminal 36 has a plurality of keys. Each of the commands: send new message 72, FIG. 2, delete this message 74, display next older message 76 and exit message 78 have associated keys labeled S, D, <, and E, respectively, indicated for actuation to transmit each of the associated commands. The standard screen format appearing on the screen 44 identifies the various labeled keys S, D, <, E associated with the respective commands. In response to actuation of a key labeled either S, D, < or E with the standard format display appearing on the screen 44, the central processing unit 24, FIG. 1, executes the command associated with the actuated key.

When the display screen 44 is initially posted, a cursor on the screen 44 is placed at a message command entry box 80. A send to window 82 contains a blank multiple character destination field 84 and two blank lines 86 for insertion of a written data text message 66. All three lines are displayed in reverse video. The destination field 82 is for entering the destination identity of the selected display terminal, including the telephone extension number of the internal telephone associated with the selected one of the display terminal and a network supervisor terminal identification code.

The two multicharacter blank lines in the text window 86 are for entering the data text to be sent to a destination display terminal. Facilitating sending a written message to an alternate display terminal or sending the same message to additional destinations, the send message window text 86 is not erased until the user exits the screen 44. An enter field 88 is displayed that is employed for sending new written data messages.

The sending of data text messages from a display terminal 36A, FIG. 1, to another terminal 36B is preferably accomplished by taking the sending display terminal 36A off-line and entering the messages command. The standard format is displayed at the requesting display terminal 36A and the cursor on the screen 44 is placed on the message command field 80, FIG. 2. If any written messages were previously received at the requesting display terminal, the read message window 66 contains the last message received.

To send a written message, the user enters the send command 72 in the message command field 80, which places the cursor in the send to field 82. If a written message is being sent to another selected display terminal, then the destination ID is the 4-digit telephone number of the destination display terminal 36B, FIG. 1. If sending a written message to the network supervisor display terminal position 50, then the destination ID is "NET".

After entering a destination ID, the user at the sending terminal 32A actuates on the keyboard 42A in the written text message in the text field 86. The written message is alternatively sent in one of two ways: 1) actuating an enter key on the keyboard 44 immediately after the last character of the message or 2) tabbing to the enter field 88 and then actuation of an the enter key (not shown) on the keyboard.

When a message is sent, the message screen format remains at the sending display terminal with the cursor placed on the message command entry box 80. The send to field 82 is overwritten with blanks and the written text message sent remains intact within the text field 86. This enables the sending of the written message to additional destinations. To send the same written message to a different destination display terminal 36C–N, FIG. 1, the user at the sending terminal 36A performs the following: 1) enters the Send command in send new message window 72 at the message command area 80; 2) re-enters a destination ID in the send field 82. 3) tabs over the message text 86 to the Enter field 88.

If the receiving destination display terminal 36B, FIG. 1, is on-line when a new written message arrives, then the work message prompt is displayed on the screen 44B in reverse video and the receiving display terminal will "beep" once. The user elects to display the received message by placing the receiving terminal 36B off-line and entering the message command on the keyboard 44B of the terminal.

The destination display terminal 36B automatically displays the last message received. The message will contain the source 68, FIG. 2, of the message, the date and time 70 message was sent (based on the call distributor clock and calendar) and the associated written message 66. Unless explicitly deleted, or a new written message is received, the received written message continues to be displayed on the display screen 44 whenever the user invokes the message command. If the message command is entered at a position that has an empty mailbox in the written messages memory hard disk 44, FIG. 1, the message text line 86 will display: No messages.

The user at a display terminal selectively replaces the written message currently displayed with the next older message. The message skipped over is in effect saved in the associated automatic call distributor position mailbox for the terminal in the hard disk 44. Even though saved written messages are skipped over, the newest written message is still displayed in the read message window 66, FIG. 2, upon the next invocation of the message command 80. When the user attempts to go beyond the oldest message stored in the associated mailbox of the hard disk 44, the newest written text message is again displayed.

Written data text messages are also deleted from a display terminal position mailbox in the hard disk memory 44 by taking the display terminal off-line and entering the message command 80. The standard format screen is displayed at the requesting display terminal, 36A, FIG. 1, and the read message window 66, FIG. 2, contains the last message received. The cursor is placed on the message command field 80. Entering the delete command 74 deletes the message that is currently displayed in the read message window 66 and then displays the next older message. If the last written message is being deleted, then "No messages." is displayed in the read message window 66 after the delete takes place. If the read message window 66 does not contain the message to be deleted, the user employs the display command 76 to page to the particular written message to be deleted.

To exit a written message session the user enters the exit command 78 in the message command field 80 and then actuates the enter key in either the enter field 88 or anywhere in the send message window 72. Then display terminal of the user is then be re-initialized.

While the advantages of the present invention are preferably obtained with the automatic call distributor 20, described above with reference to FIG. 1, the method of the invention is capable of being practiced with any other automatic call distributors having a multiport switch, a central processing unit with a switch operations memory or controlling the switch, a plurality of the internal telephones interconnectable through the multiport switch to external telephones of an external telephonic network and plurality of display terminals for displaying information relating to the operation to the switch. In any event, the preferred method of practicing the invention comprises the steps of (1) displaying information relating to the operation of the switch at the display terminals, (2) sending a written message from one of the display terminal for receipt by another one of the display terminal, (3) storing the written message at an associated switch memory coupled with the central processing unit, (4) automatically providing an identification of storage of the stored written message to the other display terminal, and (5) electing at the other display terminal to have the written message display at the other display terminal in lieu of the information relating to the operation of the switch. Also, the method for communicating display terminal written messages in an automatic call distributor in which the plurality of the display terminals are associated with a plurality of internal telephones, the internal telephones have telephone numbers which are used to identify individual ones of the plurality of internal telephones for purposes of switching calls to selected ones of the internal telephones, the method includes the steps of (1) identifying the display terminals intended for receipt of the stored messages by associating the stored messages for each display terminal with the telephone number of the internal telephone associated with the display terminal, and (2) selectively displaying written messages at the plurality of the display terminals in response to the identification of display terminals intended to receive stored written messages and the election to have written messages display in lieu of information relating to the operation of the switch.

The method for communicating display terminal written messages is also accomplished by sending the written messages to a memory location at the associated switch memory with the telephone number corresponding to the internal telephone associated with the one display terminal, and subsequently selectively displaying the written message at the one display terminal which sent the written message to the memory location. Furthermore, the method is accomplished in the internal written message communication system of the automatic call distributor system 21 by sending same written message from the one display terminal to a plurality of other display terminals receiving the message by associating the same written message with the telephone numbers of the plurality of other display terminals and automatically sending the same written messages to all the plurality of other display terminals with the associated telephone numbers. The central processing unit 24, identifies to the display terminal 36 a plurality at the plurality of different written messages stored at the switch associated memory 46 for display at the other or destination display terminal 36B. The saving of written messages in storage in the switch associated memory 46 is accomplished after displaying all the written messages at a destination display terminal and subsequent to the removal of the display of the written message at the designated display terminal.

Referring now to FIGS. 3A–3E, the switch operations memory of the automatic call distributor contains the internal written messages communication computer program to achieve the various functions of the invention described above. FIGS. 3A–3E illustrate a composite flow chart for the preferred computer program in the switch operations memory 26, FIG. 1.

Figure 3A:
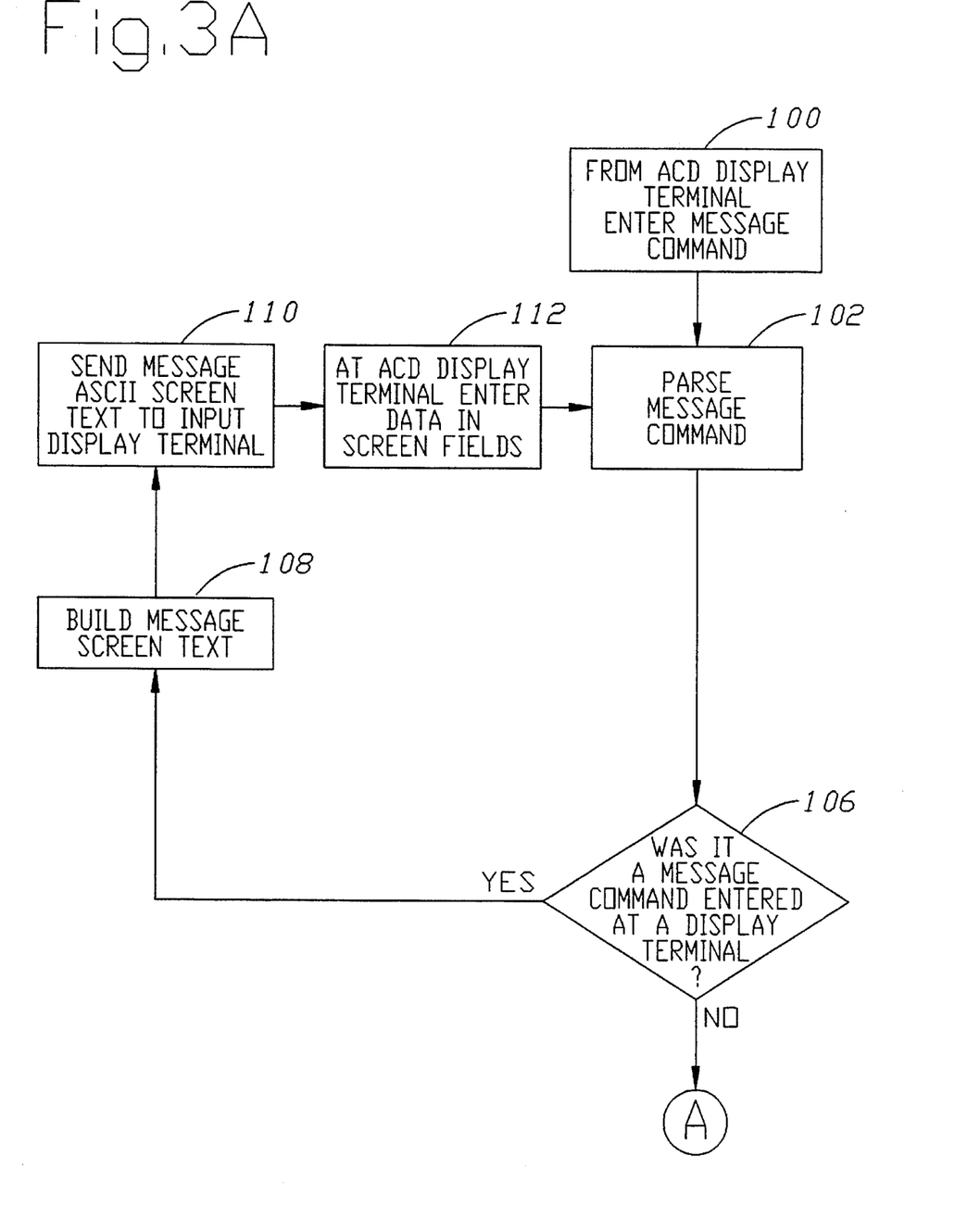
FIGS. 3A–3E form a composite flow chart of the internal written messages communication software computer program stored in the switch operations memory of FIG. 1.

Referring to FIG. 3A, the operating program of the internal written message communication system 21, FIG. 1, stored in the switch memory 26 of the present invention begins at step 100, FIG. 3A, by the user located at a data display terminal 36 which is coupled with the automatic call distributor 20: the user enters a message command through actuation of the keyboard 42 at the display terminal. In step 102, FIG. 3A, the central processing unit 24 upon receiving the message command from the display terminal 36, parses the message command to determine the origination of the received message command. In step 106, FIG. 3A, the central processing unit 24 determines if the information received was a message command entered at a display terminal 36 of the automatic call distributor 20; if the information received was not a message command from a display terminal 36, then the processing proceeds to step 114 of FIG. 3B.

If it is determined that the information received is a message command entered from a data display terminal 36, FIG. 1, then in step 108, FIG. 3A, the central processing unit 24 builds the standard message screen format text, as seen in FIG. 2, for appearance at the display terminal. In step 110, FIG. 3A, the message ASCII screen text is sent to the input of the display terminal 36, FIG. 1. In step 112, FIG. 3A, the user enters through actuation of the keyboard 42, FIG. 1, appropriate data at the various screen fields on the display screen 44 of the display terminal 36. The processing returns to step 102, FIG. 3A, to parse the received message command and to make the appropriate decisions in steps 104 and 106.

Figure 3B:
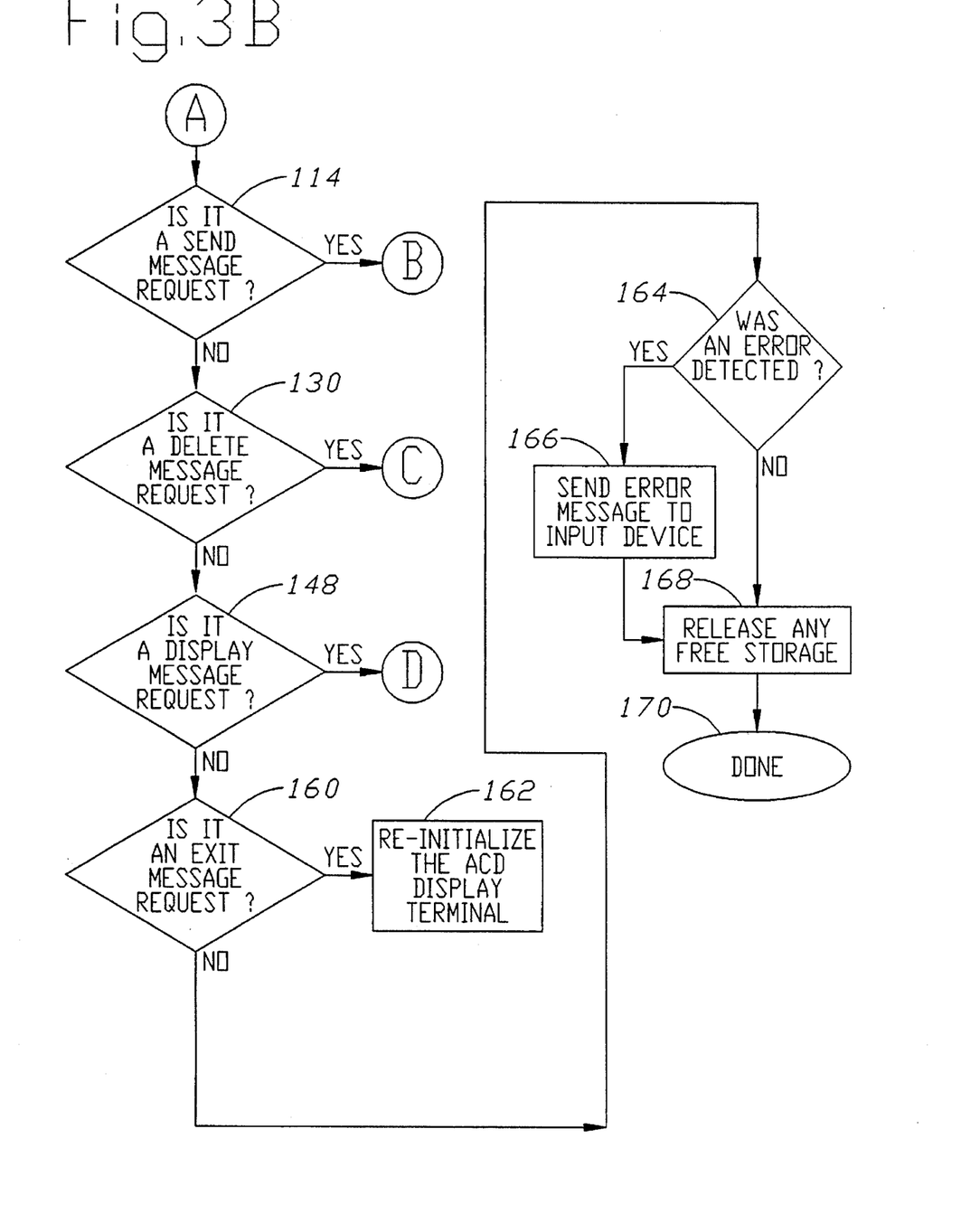

Referring now to FIG. 3B, in step 114, the central processing unit 24, FIG. 1, determines if a send message request was initiated at the display terminal 36. If a send message was requested, the program proceeds to step 116 of FIG. 3C. In step 116, FIG. 3C, a determination is made if a written text message is being sent to another or destination display terminal 36B, 36C–N coupled with the automatic call distributor 20. If the written data text message is not sent to a display terminal 36 the operation goes to step 117, to send a message to a network supervisor terminal 50, FIG. 1. The processing is completed for the send message request at step 129. If the written text message from the sending display terminal 36 is being sent to a destination display terminal 36B, then in step 118 information relating to the identification of the sending display terminal, the day of the week, day of the month, year, hour and minute that the written text message was sent from the sending terminal is stored in the message build area of the switch operations memory 26. In step 120, FIG. 3C, the sent written text message in copied into the message build storage of the central processing unit 24, FIG. 1, switch operations memory 26.

Figure 3C:
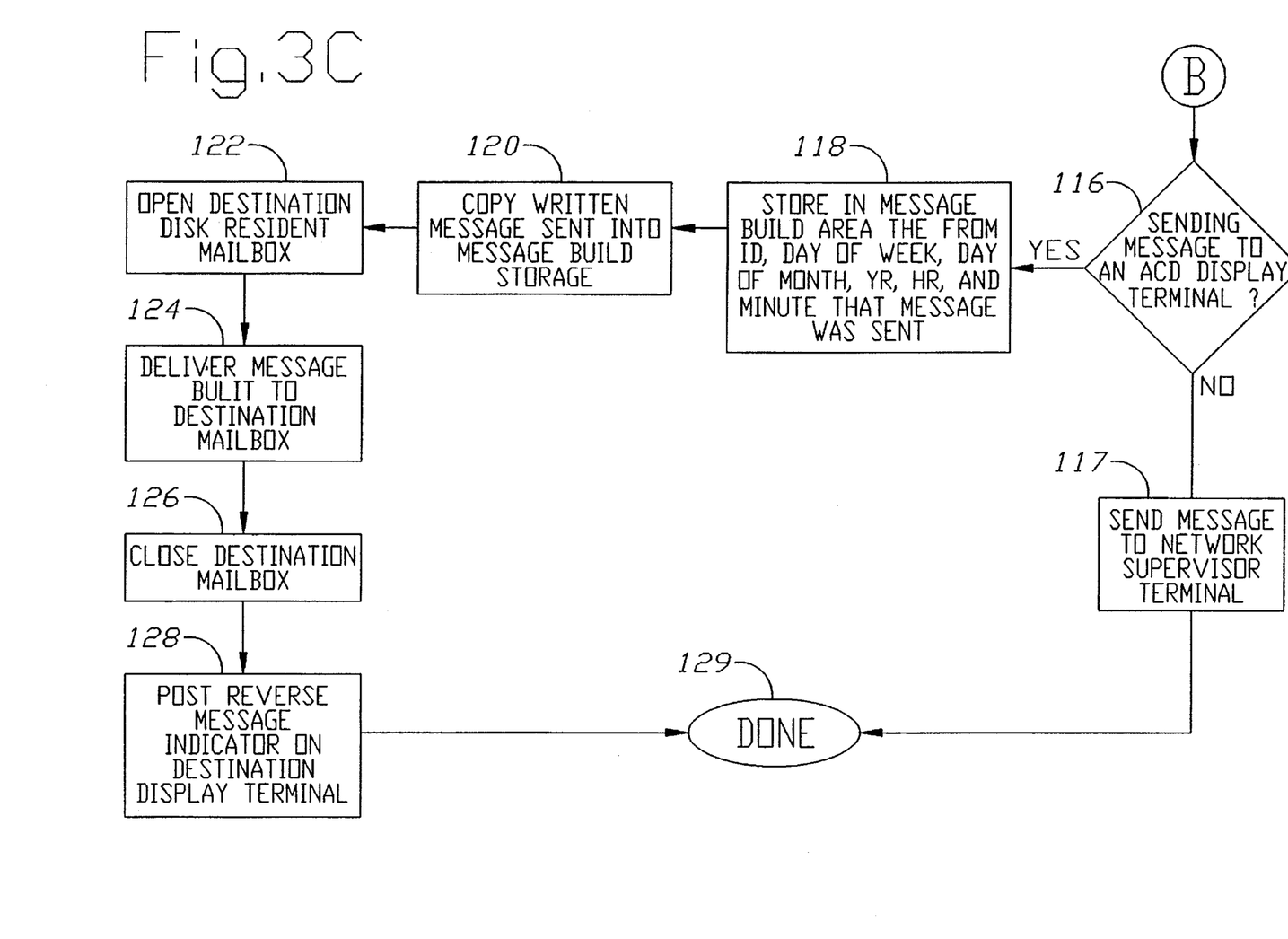

In step 122, FIG. 3C, the resident mailbox associated with the identified destination display terminal is opened in the corresponding memory location of the written message memory hard disk 46. The written text message built to the appropriate destination mailbox is delivered at the hard disk 46 in step 124. In step 126, the destination mailbox corresponding to the receiving or destination display terminal 36B is closed. In step 128, the central processing unit 24 places a message indicator prompt in reverse video at the display screen 44B of the destination display terminal 36B. This provides an indication of storage at the corresponding mailbox of the hard disk 46 of a written message to be selectively retrieved by the user at the destination display terminal 36B. The processing for the Sending message is completed at step 129.

If the information received is determined to not be a Send message request in step 114, FIG. 3B, then in step 130, a determination is made if a delete message request is received at the central processing unit 24. If a delete message request is received then the processing proceeds to step 132, FIG. 3D, to open the mailbox at the hard disk 46, FIG. 1, corresponding to the display terminal 32. In step 134, the central processing unit 24, FIG. 1, determines if only one message is stored in the particular mailbox. If only one message is stored then in step 136, FIG. 3D, the message is deleted from the mailbox on the hard disk 46, FIG. 1. In step 138, FIG. 3D, a "NO MESSAGES" indication is displayed at the read messages window 66, FIG. 2, shown on the screen 44, FIG. 1, of the display terminal 36. The mailbox of the display terminal is closed at step 140, FIG. 3D.

Figure 3D:
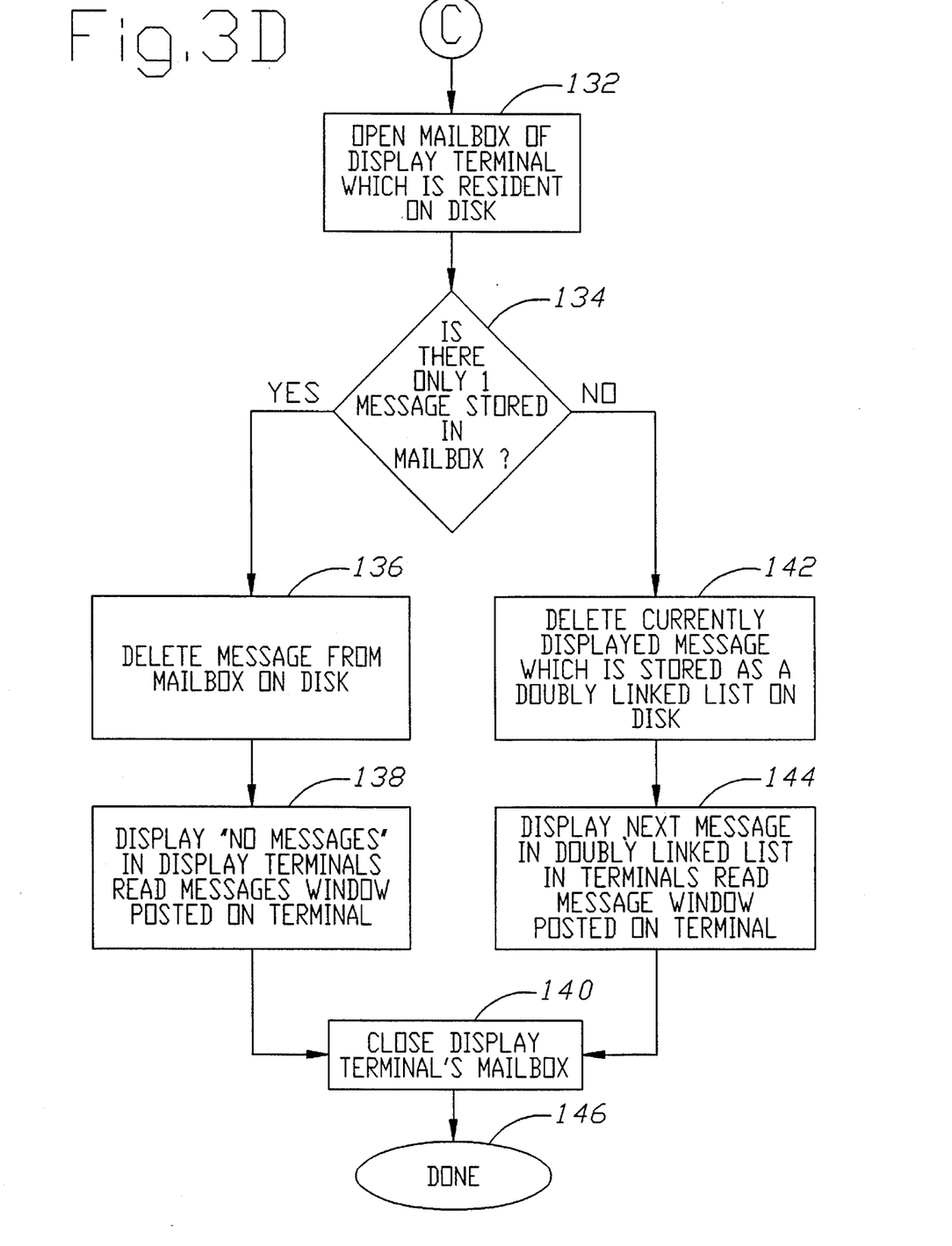
Figure 3E:
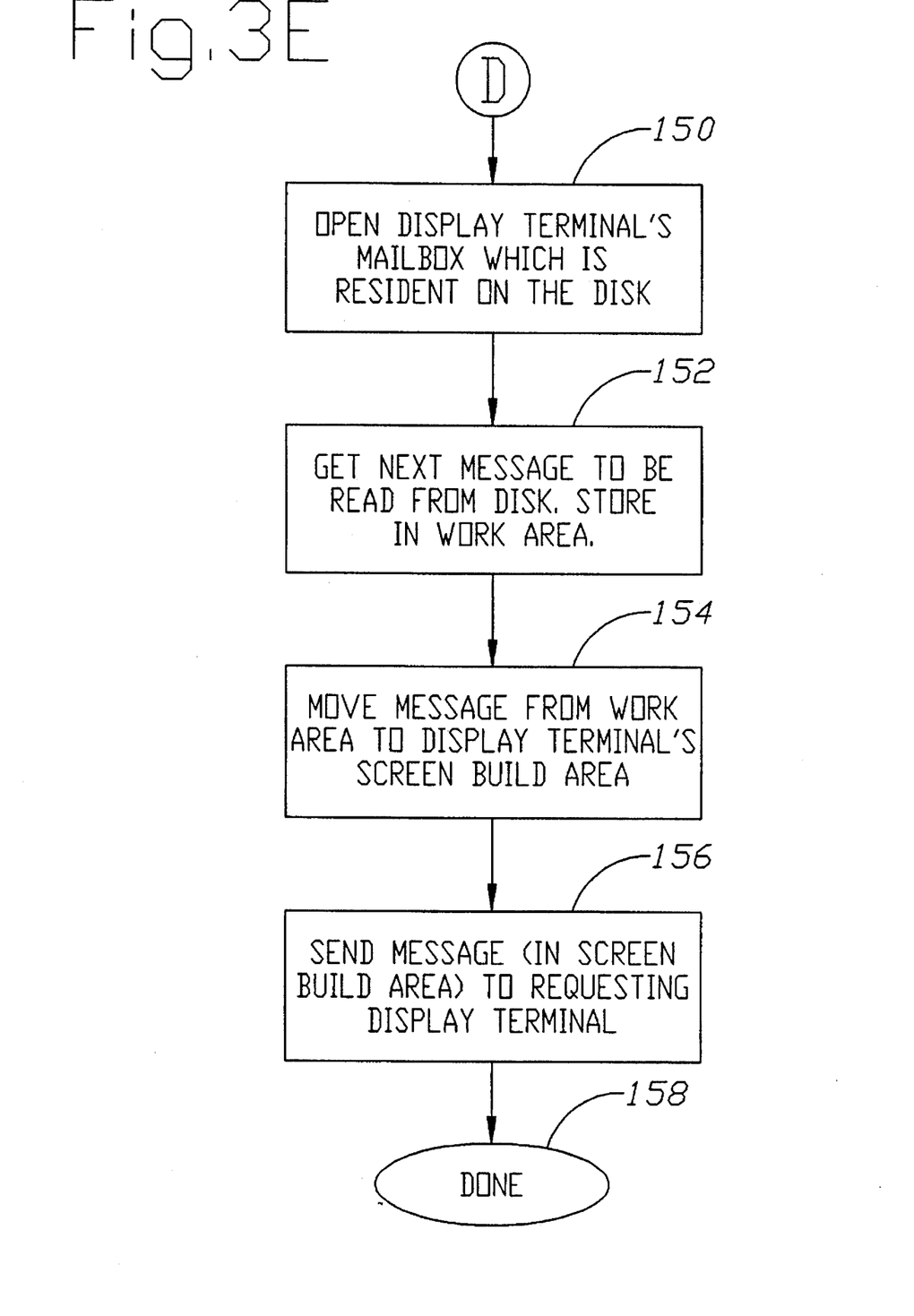

If there is not only one message stored in the associated mailbox memory location of the associated switch memory hard disk 46, FIG. 1, then in step 142, FIG. 3D, the currently displayed message which is stored as a doubly linked list on the disk is deleted. In step 144, one written data text message in the doubly linked list is displayed in the read messages window area 66, FIG. 2, of the standard display format appearing on the screen 44, FIG. 1, of the display terminal 36. The mailbox for the associated display terminal 36 is closed in step 140, FIG. 30. The processing for a delete written message request is completed in step 146.

If the received information at the central processing unit 24, FIG. 1, is not a delete message request, then in step 148, FIG. 3B, a determination is made if a display written text message request is received. If a request for a Display written message has been made then the processing proceeds to step 150 of FIG. 3E. In step 150, the mailbox which is resident on the disk 46, FIG. 1, corresponding to the data display terminal 36 is opened. The next written message to be read from the hard disk 46 is retrieved from the mailbox location in the hard disk and is stored in the work area of the internal switch operations memory 26 in step 152, FIG. 3E. In step 154, the written message is moved from the work area to the screen build area of the switch memory 26 associated with the data display terminal 36. In step 156, the written text message in the build area of the switch operations memory 26 for of the screen 44 is sent to the requesting data display terminal 36, FIG. 1. In step 158, FIG. 3E, the processing for a display written message request is completed.

In step 160, FIG. 3B, a determination is made if an exit written message request is received at the central processing unit 24, FIG. 1. If an exit written data text message is requested then in step 162, FIG. 3B, the central processing unit 24, FIG. 1, re-initializes the data display terminal 36. If no exit message request is determined then in step 164, FIG. 3B, the central processing unit 24 checks if an error was detected. If an error is found then in step 166, an error message is sent to the sending display terminal. If no error is detected then in step 168, FIG. 3B, any free storage at the switch memory 26 is released. The operation of the written message communication system program is completed at step 170.

While a detailed description of the preferred embodiment of the invention has been given, it should be appreciated that many variations can be made thereto without departing from the scope of the invention as set forth in the appended claims.

We claim:

1. In an automatic call distributor system with an automatic call distributor in which the automatic call distributor has a multiport switch, a central processing unit and a switch operations memory for controlling the switch, the automatic call distributor system having a plurality of internal telephones interconnectable through the multiport switch to external telephones of an external telephonic network and a plurality of display terminals for display of information relating to the operation of the switch, the improvement comprising:

means for sending a written message from one of the display terminals to a selected one of the plurality of display terminals;

means for storing the written message at a written messages memory for display at the selected one of the display terminals which is coupled with the central processing unit of the automatic call distributor;

means at the selected one of the display terminals for providing an indication of storage at the written messages memory automatically in response to receipt of the written message for said selected one of the display terminals; and means for electing at the selected one of the display terminals to have the written message displayed at the selected one of the display terminals in lieu of the information relating to the operation of the switch.

2. The automatic call distributor of claim 1 in which the plurality of display terminals are associated with the plurality of internal telephones, the internal telephones having telephone numbers which are used to identify individual ones of the plurality of internal telephones for purposes of switching calls to selected ones of the internal telephones, and including means for identifying the display terminals intended for receipt of stored messages by associating the stored messages for each display terminal with the telephone number of the internal telephone associated with the display terminal, and means responsive to both the electing means and the identifying means for selectively displaying messages at the plurality of the display terminals.

3. The automatic call distributor of claim 2 including means for sending written messages to a memory location associated with the telephone number corresponding to the internal telephone associated with the display terminal sending the written messages, and means for subsequently selectively displaying the stored written messages at the same display terminal which sent the written messages to the memory location.

4. The automatic call distributor of claim 3 including means at the selected one of the display terminals for sending a same written message to a plurality of display terminals by associating the same written message with the telephone numbers of the plurality of display terminals and automatically sending the same written message to all the plurality of display terminals with the associated telephone numbers.

5. The automatic call distributor of claim 2 in which said identifying means includes means for identifying a plurality of different written messages stored at the written messages memory for display at the selected one of the display terminals.

6. The automatic call distributor of claim 1 including means for saving a written message in storage in the written messages memory after display of the written message at the selected one of the display terminals and subsequent removal of the display.

7. The automatic call distributor of claim 1 including means for storing for display at all the display terminals in a standard format for display of at least one of the types of information of (a) the identity of an originator of a message, (b) the time of receipt of the message in storage in the written messages memory, (c) the location of the message in a sequence of a plurality of stored messages, (d) the identity of the selected one of the display terminals and (e) instructions for subsequent operations on the stored message.

8. The automatic call distributor of claim 7 in which said identity of the selected one of the display terminals is indicated by selectively displaying at least one of (f) a telephone number of an internal telephone associated with the selected one of the display terminals and (g) a network supervisor code.

9. The automatic call distributor claim 8 including means for storing an identity of an intended recipient of a written message by storing both of the types of information of (f) and (g).

10. The automatic call distributor of claim 1 including means associated with each of the display terminals for sending a written message into storage in the written messages memory including means for transmitting at least one of the commands of (a) send new message, (b) delete this message, (c) display next older message and (d) exit.

11. The automatic call distributor of claim 10 including means for displaying the identity of selected ones of a plurality of keys of the display terminals respectively associated with the commands (a)–(d).

12. The automatic call distributor of claim 1 in which
the storing means includes a nonvolatile memory device coupled with the central processing unit which has a plurality of memory location groups respectively associated with corresponding display terminals, and in which
each of said memory location groups has a plurality of memory locations for storing a plurality of written messages for selective display at the corresponding display terminals.

13. In an automatic call distributor system with an automatic call distributor in which the automatic call distributor has a multiport switch, a central processing unit and a switch operations memory for controlling the switch, the automatic call distributor having a plurality of internal telephones interconnectable through the multiport switch to external telephones of an external telephonic network and a plurality of display terminals for display of information relating to the operation of the switch, the improvement being a method comprising the steps of:
displaying information relating to the operation of the switch at the display terminals;
sending a written message from one of the display terminals for receipt by another one of the display terminals;
storing the written message at a written messages memory coupled with the central processing unit;
automatically providing an indication of storage of the stored written message to the other display terminals in response to receipt of the written message at the written messages memory; and
electing at the other display terminal to have the written message displayed at the other display terminal in lieu of the information relating to the operation of the switch.

14. The method of claim 13 in which the information displayed relating to the operation of the switch is stored at the switch operations memory coupled with the central processing unit.

15. The method of claim 13 in which the plurality of display terminals are associated with the plurality of internal telephones,
the internal telephones have telephone numbers which are used to identify individual ones of the plurality of internal telephones for purposes of switching calls to selected ones of the internal telephones, and including the steps of
identifying the display terminals intended for receipt of said stored messages by associating the stored messages for each display terminal with the telephone number of the internal telephone associated with the display terminal, and
selectively displaying written messages at the plurality of display terminals in response to the identification of display terminals intended to receive stored written messages and the election to have written messages displayed in lieu of information relating to the operation of the switch.

16. The method of claim 15 including the steps of
sending the written message to a memory location at the written messages memory with the telephone number corresponding to the internal telephone associated with the one display terminal, and
subsequently selectively displaying the written message at the one display terminal which sent the written message to the memory location.

17. The method of claim 16 including the steps of
sending a same written message from the one display terminal to a plurality of other display terminals by associating the same written message with the telephone numbers of the plurality of other display terminals, and
automatically sending the same written message to all the plurality of other display terminals with the associated telephone numbers.

18. The method of claim 13 including the step of identifying a plurality of different written messages stored at the written messages memory for display at the other display terminal.

19. The method of claim 13 including the step of saving a written message in storage in the written messages memory after display of the written message at the other display terminal and subsequent to removal of the display of the written message at the other display terminal.

20. The method of claim 13 in which the written messages memory is a nonvolatile memory device coupled with the central processing unit which has a plurality of memory location groups respectively associated with corresponding display terminals, and in which
each of said memory location groups has a plurality of memory locations for storing a plurality of written messages for selective display at the corresponding display terminals.

* * * * *